United States Patent [19]

Gilby

[11] Patent Number: 4,733,561
[45] Date of Patent: Mar. 29, 1988

[54] SELF-OSCILLATING, OPTICAL RESONANT SENSOR

[75] Inventor: Anthony C. Gilby, Foxboro, Mass.

[73] Assignee: The Foxboro Company, Foxboro, Mass.

[21] Appl. No.: 888,555

[22] Filed: Jul. 21, 1986

[51] Int. Cl.$^4$ .............................................. G01H 1/00
[52] U.S. Cl. ................................. 73/579; 340/870.28; 356/352
[58] Field of Search .................................. 73/800, 579; 340/870.28; 356/352, 73.1; 372/92; 455/605, 610, 617; 350/96.13

[56]  References Cited

U.S. PATENT DOCUMENTS 4,553,247  8/1985  Epworth .......................... 356/352 X
4,556,280  12/1985  Bagby .......................... 340/870.28 X
4,577,100  3/1986  Meltz et al. ....................... 73/800 X Primary Examiner—Jerry W. Myracle
Attorney, Agent, or Firm—Terrence Martin; Jack H. Wu

[57] ABSTRACT

Light from a source is communicated to a measurand site. Interferometric means located at the measurand site modulates the light by means of a resonator, the frequency of which is related to the measurand value, said resonator being driven by the modulated light to provide localized oscillator loop closure at the measurand site. Embodiments are disclosed using modified Fabry-Perot and Michelson interferometer designs.

30 Claims, 29 Drawing Figures

WHEN:

$$G_1 = (I_{mod}/I_0)(1/\Delta x)$$

AND $$G_2 = (\Delta x)/(I_{mod}) \quad \text{—EQUATION I}$$

THEN, FOR SELF-SUSTAINING OSCILLATIONS:

$$G = I_0 G_1 G_2 \geq 1$$

WHERE:

G IS THE OVERALL GAIN OF THE OPTOMECHANICAL LOOP $G_1$ IS THE GAIN OR TRANSFER FUNCTION FOR UNMODULATED LIGHT TO MODULATE LIGHT BY THE VIBRATING RESONATOR $G_2$ IS THE GAIN OR TRANSFER FUNCTION FOR MODULATED LIGHT TO VIBRATIONAL MOTION OF THE RESONATOR $I_0$ IS THE UNMODULATED LIGHT FLUX OR OPTICAL POWER INCIDENT ON THE RESONANT STRUTURE $I_{mod}$ IS THE IRRADIANCE OF THE MODULATED LIGHT FLUX DELTA x IS THE AMPLITUDE OF MOTION OF THE RESONANT STRUCTURE ASSUMING THAT THE LIGHT MODULATION AND RESONATOR MOTION HAVE THE CORRECT PHASE FOR POSITIVE FEEDBACK

*FIG. 2*

WHERE:

OPD IS THE OPTICAL PATH DIFFERENCE BETWEEN TWO ADJACENT
TRANSMITTED RAYS (SEE ALSO FIG. 3; RAYS 46 AND 48)

THE PHASE DIFFERENCE BETWEEN ADJACENT TRANSMITTED RAYS IS $$\text{DELTA} = (4\pi \times n_c/\lambda) \cos\Theta$$

$$\text{OPD} = 2xn_c \cos\Theta$$

—EQUATION II lambda IS THE WAVELENGTH IN VACUUO
$n_c$ IS THE INDEX OF REFRACTION OF THE MEDIUM INSIDE THE CAVITY
Theta IS THE ANGLE OF INCIDENCE OF RAYS INSIDE THE CAVITY
x IS THE CAVITY WIDTH

*FIG. 5*

WHERE $\quad \dfrac{I_t}{I_o} = \left[1 + F \sin^2\left(\dfrac{\delta}{2}\right)\right]^{-1} = \mathcal{A} \quad$ —EQUATION III $F = 4R/(1-R)^2$, THE COEFFICIENT OF FINESSE R IS THE REFLECTION COEFFICIENT OF EACH OF THE CAVITY BOUNDARIES
(42 AND 44) TAKEN IN ISOLATION $\mathcal{A}$ = THE AIRY FUNCTION

*FIG. 6*

$$X_{(MAX\ SLOPE)} = \frac{\lambda}{4\pi} \cdot \Delta_{(MAX\ SLOPE)} + \frac{N\lambda}{2n_c \cos\theta}$$
WHERE:
$N = 0, 1, 2, \ldots$
—EQUATION IV
FIG. 15
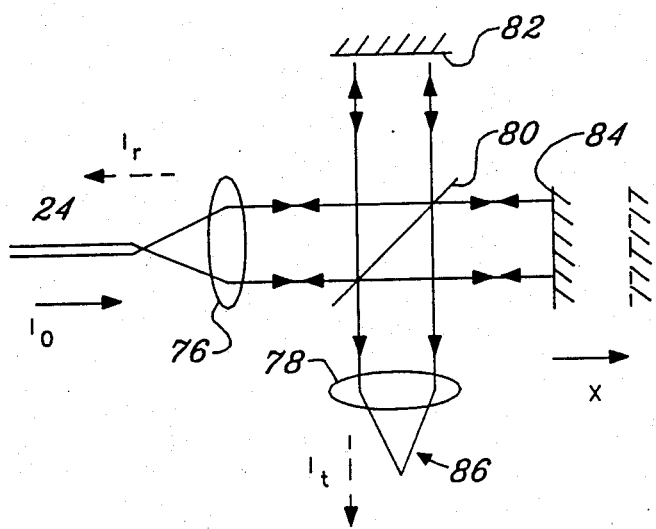
FIG. 16
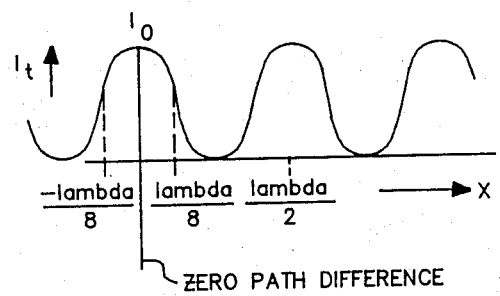
FIG. 17

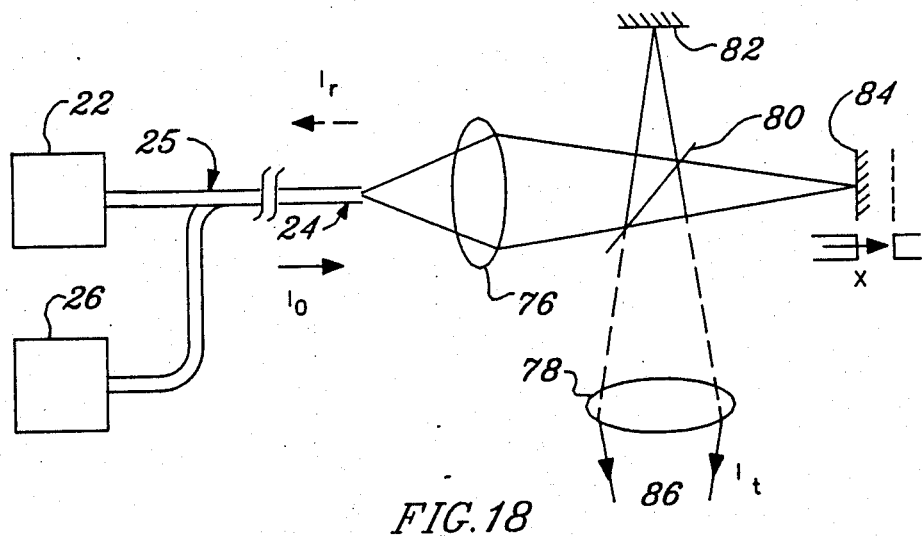
*FIG.18*
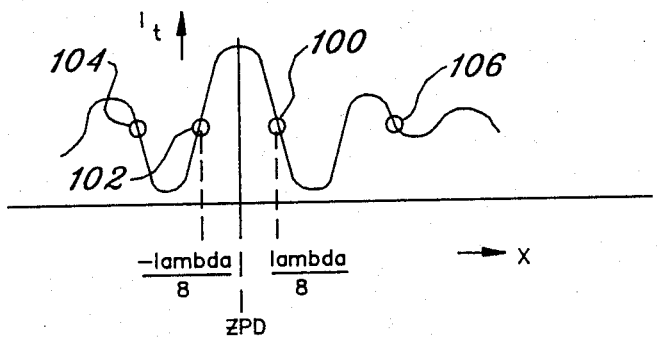
*FIG.19*
$$I_t = I_0/2\,[1+\cos(4\pi x/\lambda)] \qquad \text{—EQUATION V}$$
*FIG.20*

$$G_1 = 1/I_0(dI_t/dx)_{max} = \pm 2\pi/\lambda \quad - \text{EQUATION VI}$$

$$\text{WHEN} \quad X = \pm \frac{\lambda}{8}$$

FOR lambda = 830 NANOMETERS, lambda/8 = 0.104 MICROMETERS, AND $G_1$ = 7.6/ MICROMETER

PLAN VIEW

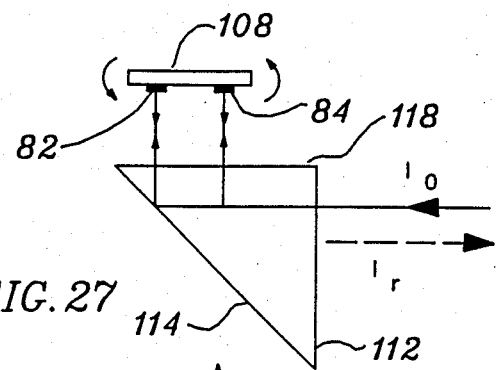
FIG. 27
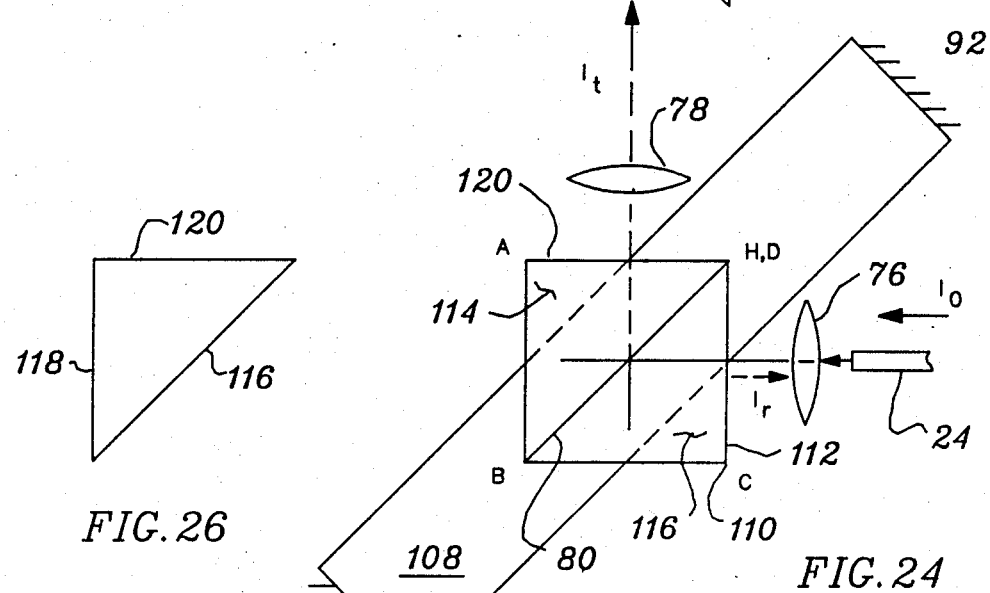
FIG. 26
FIG. 24
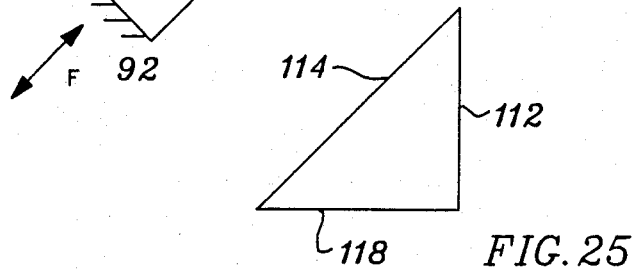
FIG. 25

SELF-OSCILLATING, OPTICAL RESONANT SENSOR

FIELD OF THE INVENTION

This invention relates to the field of fiber optic based communications and measuring apparatus and more particularly to light stimulated oscillating resonant element apparatus and methods using unmodulated light transmitted along an optical fiber as the low-level power source. A single optical fiber carries light power to a transducer, where a measurand is applied to a resonant element, the resonant element being both sensed and driven by interferometric methods in combination with the photokinetic effect.

BACKGROUND OF THE INVENTION

As the advantages of fiber optic based communication and control of industrial processes becomes better known, increasing emphasis is being placed on various methods of simple, inexpensive, and reliable communication of low level optical power via fiber optics to the sensor site for making a desired measurement, and returning the measurement information on fiber optic paths to the control and measurement location. Among the many problems facing designers of such process control systems are the need for few, low light level optical paths and methods of accurately and reliably carrying out the measurements in such a way that the derived measurement information may be accurately communicated by means of fiber optic signals. In the application of resonant element sensors, it is especially important that low power, highly efficient sensors be developed to modulate the light available. One problem related to self-oscillating optical sensors is in achieving high opto-mechanical loop gain in order to reduce the optical power threshold needed to drive the resonator to reasonable levels.

Instruments are well known wherein the resonant frequency of a resonant element subjected to a force is a function of the tension (or compression) applied to that resonator. It has been recognized that a force measuring instrument can be based on this relationship by causing the resonator to vibrate while a tension or compression force is applied thereto and measuring the vibration frequency. An application of this principle for vibrating wire resonators is known from U.S. Pat. No. 4,329,775.

For the purpose of this limited description, "process control" includes both individual variable processes and complex multivariable processes involving a large number of controlled process conditions characterizable as physical parameters or "measurands", such as acceleration, fluid flow, flow rate, temperature, pressure, differential pressure, level, and the equivalents and derivatives thereof. "Resonant mechanical structure", "resonator", and "resonant element" as used herein generally refer to beam (hollow beam, cantilevered beam and cantilevered hollow beam, and double- or other multiple-beam elements), and ribbon, wire or other articles of manufacture, and their equivalents, all of which can be resonated at particular oscillation frequencies. Specifically included are tuning fork structures of the single- and double-ended varieties, as well as multiple tine tuning fork structures.

"Fiber optic", "optical fiber", and "optical power" path or pathway means and equivalent terms refer to single or multiple mode fiber optic communication paths.

As used herein, the term "optical power", light, or light flux includes electromagnetic radiation of wavelengths between 0.1 and 100 micrometers, and specifically includes infrared, ultraviolet, and visible electromagnetic radiated power. For simplicity, such electromagnetic radiated power may be referred to generally and without limitation as "light", optical flux, or optical power. Such optical power may also be described as "steady" or "continuous" or "unmodulated" in order to distinguish it from optical power signals which are modified to carry information. The term "optical power" specifically includes coherent and incoherent light power.

"Modulation" is used broadly herein, and it is intended to mean modifying (or the modification of) some characteristic or characteristics of a light beam so that it varies in step with the instantaneous value of another signal, and specifically may be used herein to describe amplitude modulation and frequency modulation. "Unmodulated optical power" refers to optical power which is unmodulated in this sense.

"Monochromatic" refers to optical power composed of a single wavelength. "Collimated light" refers to optical power having rays which are rendered substantially parallel to a certain line or direction.

"Fluid" includes gases and/or liquids. The term "force" is used to describe any physical parameter or phenomenon capable of moving a body or modifying its motion, and specifically includes force exerted per unit area (pressure) and any parameter or phenomenon capable of conversion to pressure.

"Photothermal effect" and "photokinetic effect", as used herein, refer to the phenomenon wherein photons striking a suitable surface or surface coating cause localized heating, such heating being sufficient to cause localized expansion of the coating or substrate, and thereby producing motion.

SUMMARY OF THE INVENTION

The present invention relates to a self-oscillating, optically powered resonant sensor located in the process environment and configured to sense a measurand of interest such as pressure, differential pressure, force, acceleration, or temperature. A source of unmodulated optical power conveys optical power to the sensor site, preferably via an optical fiber. The optical power source is located remotely in a suitable place, such as a control room, along with detection means to receive back-reflected, modulated optical power by way of the fiber and a fiber splitter. That is, modulated power in which the modulation is related to the measurand is reflected back along the same optical fiber to the remote location.

The self-oscillating resonant transducer of the present invention uses an interferometric technique in which the motion of a vibrating resonant mechanical structure efficiently modulates a portion of the received optical power and, advantageously, converts a portion of the modulated light into mechanical energy of resonator vibration. This is accomplished in such a way as to enhance, by local feedback, the resonant motion of the vibrating resonant element, thereby sustaining oscillation thereof. These functions of the resonant element self-oscillating structure can be combined in a number of practical designs. The present disclosure includes two specific embodiments: the first preferred embodiment makes use of the Fabry-Perot optical cavity interferometer principle as an integral part of the self-oscillating resonator. In a second preferred embodiment, a Michelson interferometric technique is used to achieve the sensitive light modulation needed for a self-oscillating resonant sensor. It is an important advantage of the present invention that the positive feedback loop closure needed to sustain oscillation may be located entirely at the sensor site. Variations of these embodiments are also described herein.

BRIEF DESCRIPTION OF THE DRAWINGS

Numerous features of the invention disclosed herein will be apparent upon examination of the several drawing figures forming a part hereof.

Solid line arrows may be used to indicate steady light direction of travel herein, while dotted line arrows may be used to indicate pulsating or modulated light direction. Collimated light is shown conventionally, e.g., diverging from a source, the light arrives at a lens where it is converged to substantially parallel paths. In all views, like reference characters indicate corresponding parts:

FIG. 2 is Equation I, wherein it is shown that the optomechanical loop gain must be at least one for sustained oscillation;

FIG. 5 is Equation II, an expression for the optical path difference and phase between adjacent transmitted rays shown in FIG.3;

FIG. 6 is equation III, the expression of the Airy function;

FIG. 15 is Equation IV, which shows how the cavity width $x_{(max\ slope)}$ may be selected to maximize modulation sensitivity;

FIG. 16 shows a simple conventional Michelson interferometer;

FIG. 17 illustrates the modulation of transmitted light flux as shown for the case of monochromatic, parallel light as the target mirror in FIG. 16 moves;

FIG. 18 illustrates an improvement on the basic Michelson interferometer for use with a microresonator;

FIG. 19 illustrates the variation in transmitted light flux as the target mirror of FIG. 18 moves;

FIG. 20 is Equation V, which describes the variation of transmitted light with optical path difference for an ideal Michelson interferometer as shown in FIGS. 16 and 17;

FIGS. 24 through 27 are multiple views of the prism beamsplitter and resonator suitable for use with the Michelson interferometer embodiment of the present invention.

DESCRIPTION OF THE PREFERRED EMBODIMENT

Figure 1:
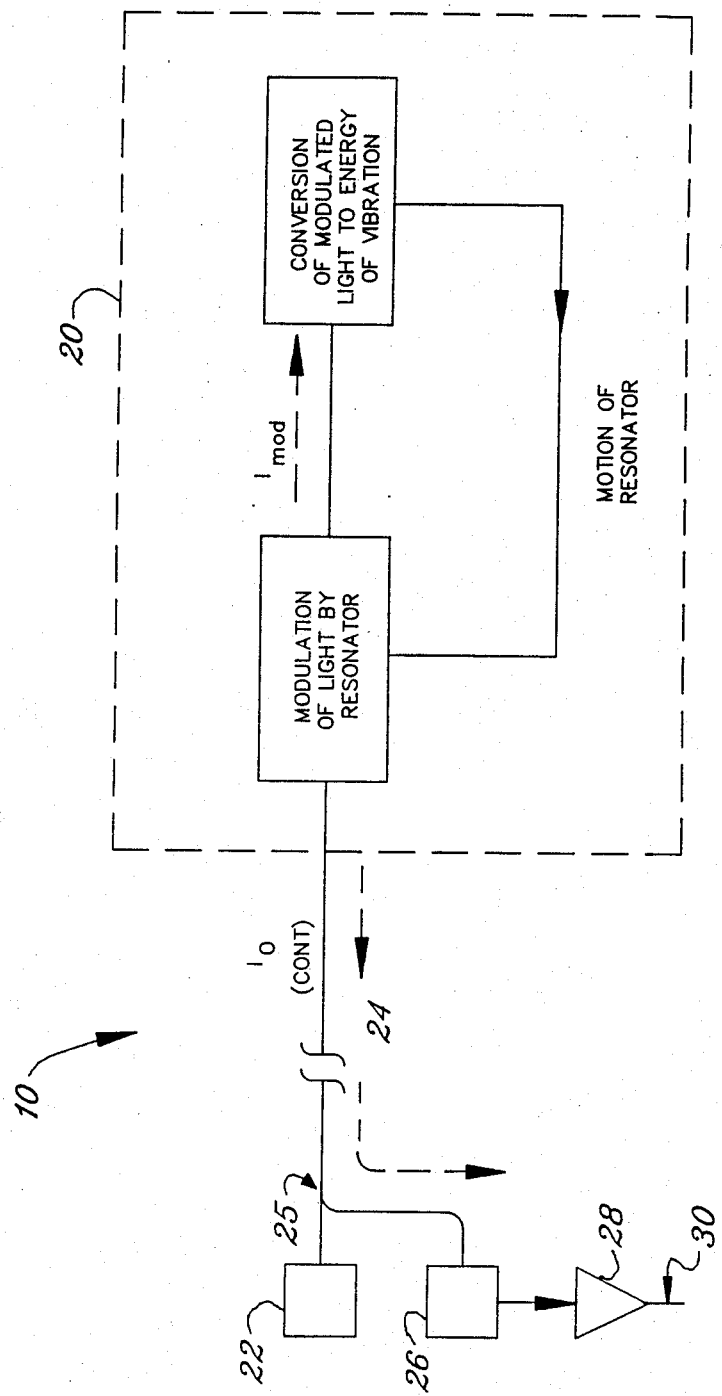
FIG. 1 is a simplified block diagram of the invention.

In the block diagram in FIG. 1, the self-oscillating resonant sensor system 10 is illustrated, showing an optically-powered resonant sensor 20, a light source 22, an optical fiber 24 pathway, a fiber splitter 25, detection means 26, and which includes output means 28 for producing an output signal 30.

The self-oscillating, optically powered resonant element sensor 20 is located in the process environment and configured to sense a measurand of interest such as pressure, differential pressure, force, acceleration, or temperature. It is connected to the light source 22 of unmodulated optical power, preferably by the optical fiber 24. The optical power source may be located remotely in a suitable place, such as a control room, along with the detection means 26 to receive modulated and back-reflected optical power via optical fiber 24 and fiber splitter 25. The conventional detection means 26 and output means 28 can be used to receive the light modulation frequency and convert it to the value of the measurand to provide an output signal 30.

The self-oscillating optically powered resonant sensor 20, apart from sensing the measurand and returning an optical frequency signal, combines several novel functions. By using an interferometric technique, the motion of the vibrating structure efficiently modulates a portion of the received optical power by reflection. In a second step, a portion of the modulated light is converted into resonator mechanical energy of vibration by the photothermal effect previously described. This is accomplished in such a way as to enhance, by positive feedback, the resonant motion. The oscillation loop is closed at the measurement site.

It is known that in order to function as an optically-powered mechanical resonator, the optomechanical loop (shown in FIG. 1) must have a loop gain which is equal to or greater than unity. See Equation I, FIG. 2, which is explained hereinafter.

It should be observed that the optomechanical drive must have the correct phase relationship with the modulated light so as to give positive feedback.

There is a threshold value of source or unmodulated light flux or power ($I_0$) which must be exceeded in order to provide an overall gain (G) greater than unit (one). The invention apparatus should preferably have sufficient values of unmodulated-to-modulated light gain ($G_1$) and modulated light-to-mechanical motion gain ($G_2$) so that the flux ($I_0$) may be reduced to a few microwatts. This should preferably be consistant with a low cost light source and optical fiber pathway means.

Once the energizing source of optical power is supplied, coherent resonant vibrations develop in the sensor from small random ambient noise excursions until the amplitude has increased to a point where the total loop gain drops to unity. Vibrations will not grow indefinitely due to excess losses at high amplitudes and due to the inherent self-limiting nature of the interferometric modulation scheme, as will be seen from the following description.

The manner in which these functions of the resonant structure can be combined in a number of practical designs is described in detail hereinafter, for illustrative purposes only. The invention includes these examples and their equivalents. The first preferred embodiment makes use of a Fabry-Perot optical cavity as an integral part of the self-oscillating resonator.

Figure 3:
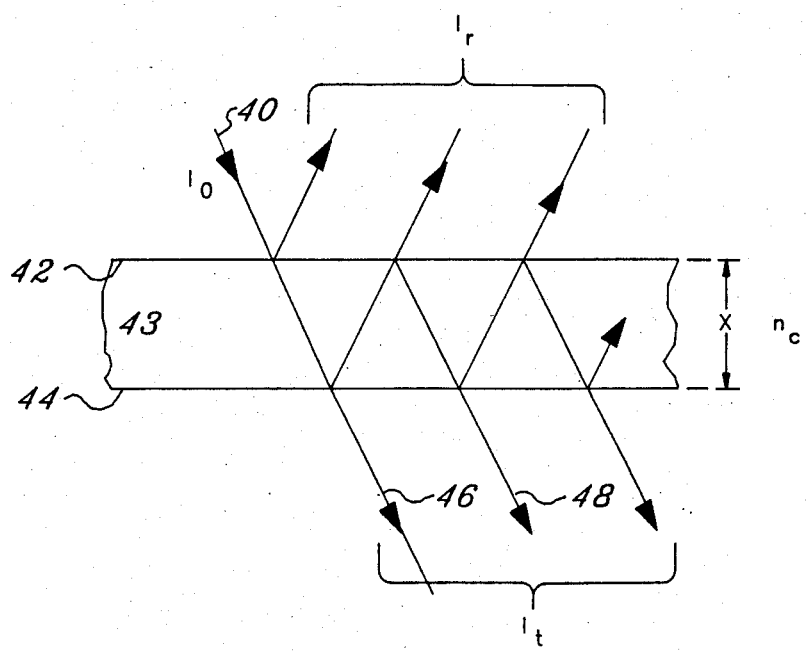
FIG. 3 depicts basic principles of Fabry-Perot interferometry as applied to a single beam of parallel, monochromatic light incident on a transparent cavity.

There is shown in FIG. 3 an incident unmodulated light beam 40, which beam includes flux ($I_0$), a partially reflecting boundary 42, a cavity forming a Fabry-Perot optical cavity 43, a partially reflecting boundary 44, and adjacent transmitted rays 46, 48 forming a part of the transmitted light flux ($I_t$).

FIG. 3 shows schematically the beam 40 of unmodulated light flux ($I_0$), incident on the partially reflecting boundary 42. The beam is divided into transmitted rays ($I_t$) and reflected rays ($I_r$).

Figure 4:
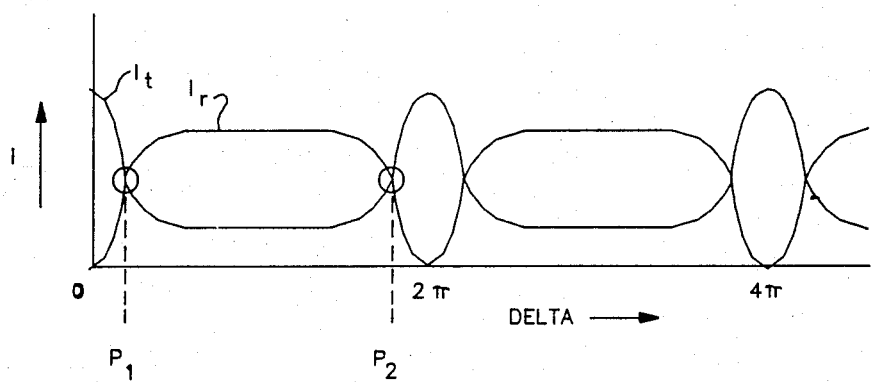
FIG. 4 graphically illustrates the points when high modulation efficiency of the invention occurs.

FIGS. 3 and 4 depict the well-known principles of Fabry-Perot interferometry which, for example, are more fully described in Hecht, E. and Zajac, A., "Optics" (Addison-Wesley; Reading, MA, 1979), pp. 306-311. A beam of substantially parallel and substantially monochromatic light is incident on the transparent cavity 43 of FIG. 3, defined by two partially reflecting boundaries 42 and 44. Multiple reflection and transmission occur, yielding a composite reflected beam ($I_r$) and a composite transmitted beam ($I_t$). The optical path difference (OPD) between two adjacent transmitted rays such as 46 and 48 is shown in Equation II, FIG. 5.

As cavity width is increased the individual reflected and transmitted waves $I_r$ and $I_t$ interfere so that the optical power in the composite reflected and transmitted beams varies as shown in FIG. 4. The transmitted power is given by the Airy function, Equation III, see FIG. 6. The Airy function is discussed in "Optics", mentioned above.

FIG. 4 shows how the transmitted and reflected optical power varies with the phase difference between adjacent rays, such as rays 46 and 48 in FIG. 3. Points $P_1$, $P_2$, etc. on FIG. 4 indicate values of the phase difference, delta, where $I_t$ or $I_r$ change most rapidly for a small change in delta, therefore corresponding to desirable working values of phase difference to maximize light modulation.

Differentiating Equation III (FIG. 6) gives these values of delta where modulation efficiency is maximum, or $delta_{max\ slope}$. The corresponding desirable values of cavity width x can then be obtained from Equation IV (FIG. 15). $I_t$ decreases with delta at point $P_1$ but increases with delta at point $P_2$. This choice of the sign of the light modulation with respect to cavity space x is made use of to ensure positive feedback in a self-oscillating resonant loop, as described below.

The above brief review of Fabry-Perot interference can be extended to include incident light which is not perfectly parallel or not monochromatic. The cavity may have internal coatings to enhance reflectivity and therefore increase the contrast or "finesse" of the interference fringes. Absorptive materials may be used for these internal cavity coatings, in which case an extension of the standard theory used to derive Equation III, see FIG. 6, shows that the absorbed light varies as the cavity width x is changed. These additional properties will be referred to at appropriate points in the following discussion. It is preferred that the internal cavity surfaces be optically flat and parallel, preferably within a fraction of a wavelength of the light being used.

The preferred optomechanical drive mechanism for the self-oscillating resonator is based on the photokinetic effect, disclosed in copending U.S. patent application Ser. No. 06/755,646, see FIGS. 7 and 8 hereof, disclosed below.

Figure 7:
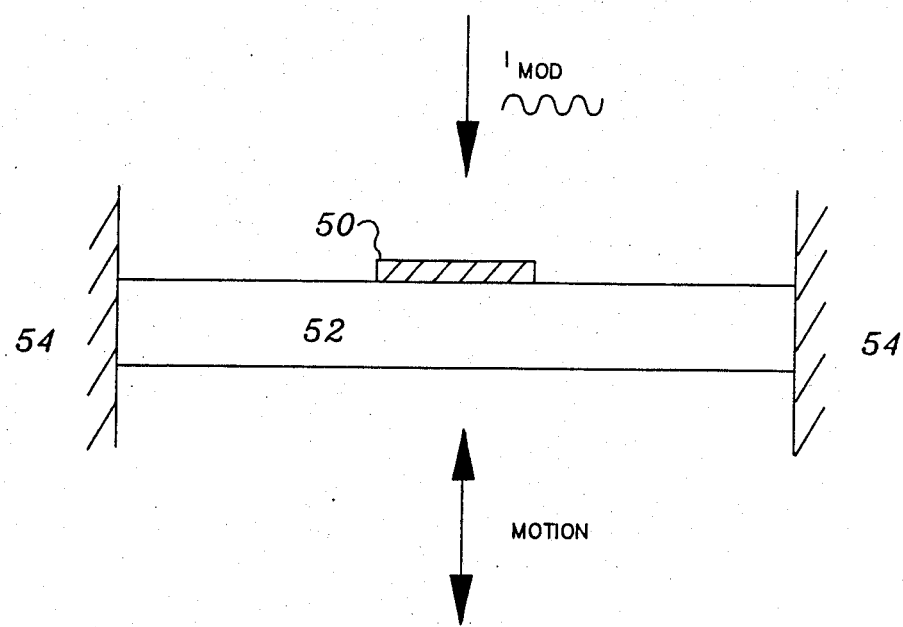
FIG. 7 illustrates the photokinetic mechanism of the first prferred embodiment of the invention.

There is shown in FIG. 7 a metal film 50 on the surface of fixed beam resonator substrate 52 fastened between end supports 54.

The photokinetic effect is a complex phenomenon, not completely understood. The following description explains the main features of the effect. Modulated light ($I_{mod}$), absorbed for example by a metal film 50 suitably located on a resonator substrate 52, causes the film to expand and results in a bending or shear force on the underlying substrate through differential expansion. This is the stress mechanism which drives the vibration. The resonator is shown here as a fixed-ended beam resonator substrate 52 which is held rigidly by supports 54. When the frequency and phase of the modulated light correspond to the natural frequency of the resonant structure, the resonator will absorb energy and store it as increased energy of motion. In short, the beam vibrates.

The phase relationship between the modulated light incident on the metal film 50, and the motion of the resonator thereby induced at resonance, is a factor in achieving positive feedback in the optomechanical oscillating loop. For example, it is convenient if this phase relationship is such that the beam is at its maximum downward amplitude, and the coating (metal film) 50 under maximum compressive stress, when the light flux is at its maximum.

This convenient phase relationship can arise as follows, see FIG. 8. The temperature rise (indicated as the change in temperature, Delta T) in the metal film is the integral of the light flux, and lags 90 degrees behind it. The film expands and contracts in phase with the light-induced temperature changes and results in motion of the beam. The amplitude maximum of the beam will lag 90 degrees behind the stress maximum. Thus, in FIG. 7, the beam is at its maximum downward amplitude when the light flux incident on metal film 50 is at its maximum.

In this example the phase relationship between light intensity and motion is such that the resonator amplitude maxima correspond with light flux maxima. Importantly, the interferometric modulation techniques which produce light flux maxima at the resonator motion maxima, in addition give the flexibility to choose the working point on either side of an interference fringe as required to maximize positive feedback.

The foregoing comprises the basis for one implementation of the physical phenomena called the photothermal or photokinetic effect underlying the present invention. Other implementations may exist. For example, depending on the material of the resonator, a metal film may not be required for the light-to-heat-to-kinetic energy conversion.

Turning now to a description of a self-oscillating resonant structure where these functions are integrated, FIGS. 9 through 14 depict a resonant transducer 61 of the type known as a double tuning fork (DTF). Eer-Nisse U.S. Pat. No. 4,372,173 is an example of such a device. A DTF is well known as a balanced mechanical structure of high Q (Q is used here as a measure of the sharpness of resonance or frequency selectively of the resonator). At resonance in the fundamental mode the two tines move in and out in antiphase with the maximum amplitude at the center. If an axial tension force F is applied longitudinally to the DTF the frequency increases.

Figure 9:
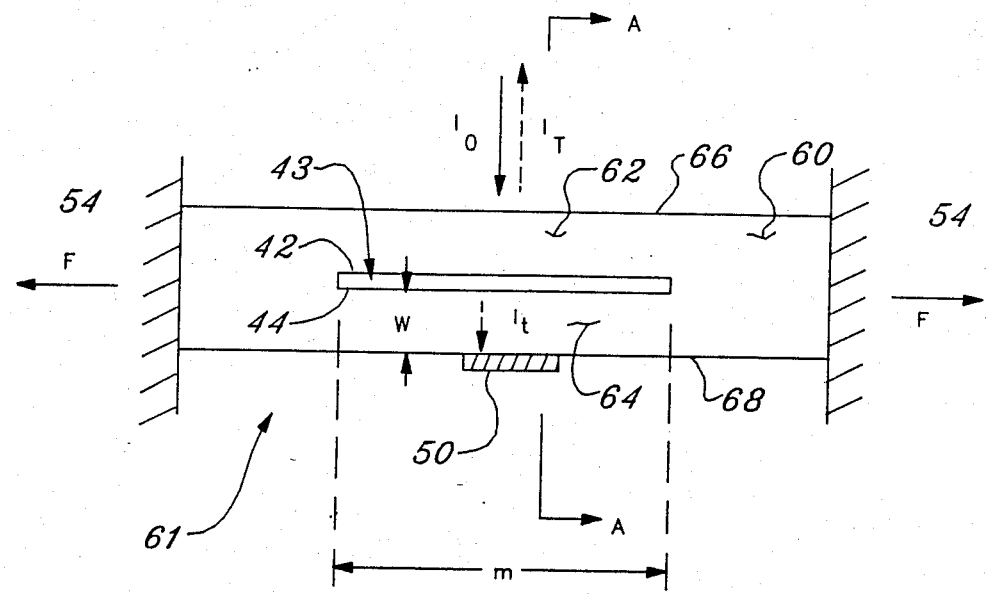
FIG. 9 shows a double tuning fork resonant transducer.

There is shown in FIG. 9 a partially reflecting boundary 42 which is the inside surface of a first fork tine 62, cavity 43, partially reflecting boundary 44 which is the inside surface of a second fork tine 64, metal film 50, end supports 54 (at least one of which is normally movably in response to the measurand, which may be an applied force or the equivalent which changes the compression and/or tension of resonator 60), a double tuning fork resonator 60, resonant element 61, the outer surface 66 of tine 62, and the outer surface 68 of tine 64.

Figure 10:
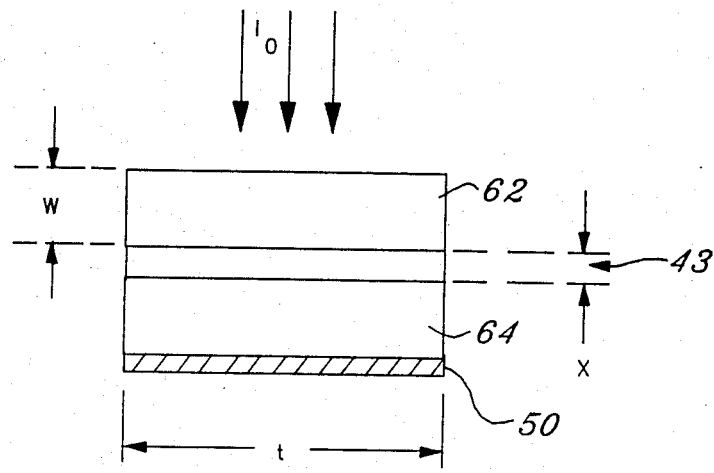
FIG. 10 shows a view of FIG. 9 taken at section A—A.

There is shown in FIG. 10 cavity 43, metal film 50, first fork tine 62 and second fork tine 64.

The design shown in FIGS. 9 through 14 shows a DTF where the beams have a small width (w) to thickness (t) ratio which reduces the stiffness in the direction of bending. This, together with a high Q, favors relatively large excursions of the beams for a given amount of absorbed mechanical energy.

The DTF resonator 60 of the present invention is constructed with tines 62, 64 which are optically transparent. The inside surfaces (partially refelecting boundaries 42 and 44) of the space between the tines 62, 64 form a Fabry-Perot optical cavity 43 such as shown and described in FIG. 3. The cavity width ("x") may be selected to be close to $x_{(max\ slope)}$ where the light modulation is greatest for small oscillations in x. See Equation IV, FIG. 15, and the Fabry-Perot interferometer discussion above.

In FIGS. 9 and 10 a metal film 50 is deposited on the outer surface 68 of tine 64. An antireflection coating (not shown) may be advantageously deposited on outer surface 66 of tine 62. The metal film 50 absorbs modulated light beam ($I_t$) transmitted through the cavity 43 and provides optical-to-mechanical energy conversion as previously described in association with FIGS. 7 and 8. The unmodulated light flux $I_0$ and the reflected rays $I_r$ are also shown.

Figure 11:
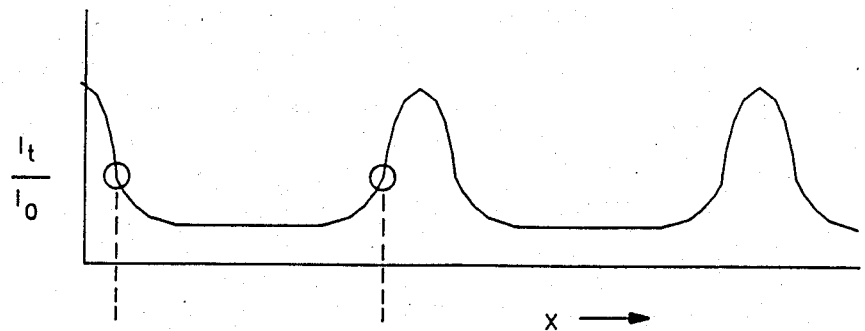
FIG. 11 illustrates suitable at-rest values of the cavity width which provide positive feedback for the embodiment of FIGS. 9 and 10.

FIG. 11 shows the at-rest cavity 43 spacing x corresponding to $x_{(max\ slope)}$ (that is, the point of maximum slope of $I_t/I_0$ versus x) which provides positive feedback as previously described.

Figure 12:
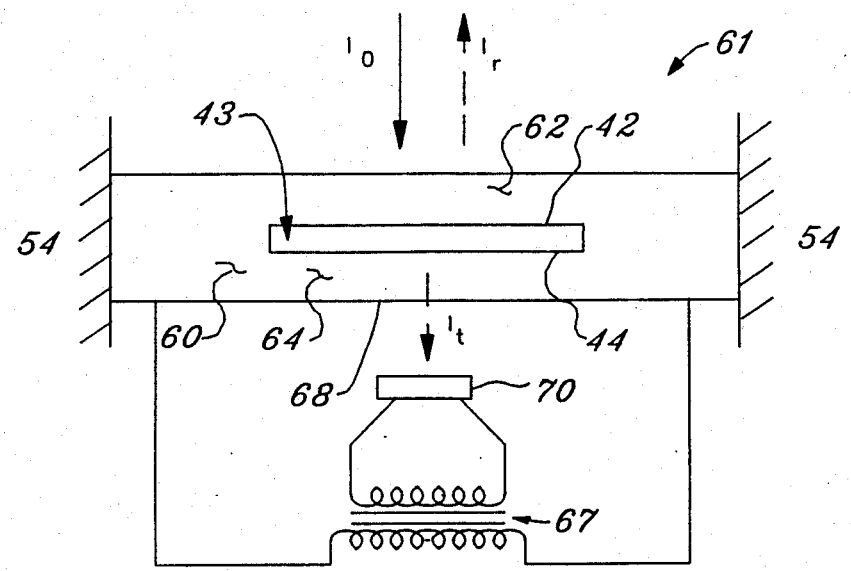
FIG. 12 exhibits an embodiment of the invention wherein the modulated transmitted light beam exits the outer surface of a tuning fork tine to drive a resonator via a photo cell.
Figure 14:
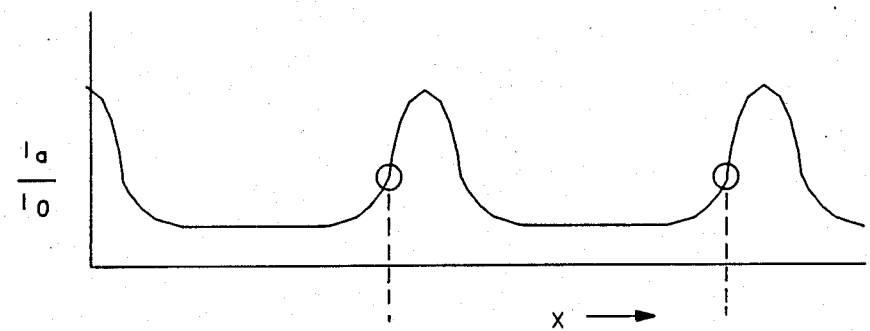
FIG. 14 graphically illustrates how a suitable at-rest cavity width for the embodiment of FIG. 13.

There is shown in FIG. 12 cavity 43, end supports 54, double tuning fork resonator 60, resonant transducer 61, first fork tine 62, second fork tine 64, outer surface 68 of tine 64, photodetector 70, and transformer 67. FIG. 12 shows an alternate embodiment of the present invention in which the modulated transmitted light beam ($I_t$) exits the outer surface 68 of tine 64 and is absorbed by a photodetector 70 or other light-to-electrical power transducer such as a photocell. Surfaces 66 and 68 may be advantageously antireflection coated. The electrical energy produced by photodetector 70 may be used to drive the resonator 60 via impedance matching transformer 67. This may be accomplished by conventional means such as the piezoelectric effect if the resonator 60 tines is made of piezoelectric material (such as crystal quartz or its equivalents) or through a deposited piezoelectric film (not shown) such as zinc oxide (ZnO) for substrate materials which are not piezoelectrically active. The latter is taught in copending U.S. patent application Ser. No. 06/726,455 now U.S. Pat. No. 4,615,906.

The photodetector 70 may be integrated directly onto the lower surface 68 of tine 64. This is particularly true if the substrate material is, for example but not as a limitation, silicon or the equivalent.

There are, of course, other electromechanical drive mechanisms known to those artisans of ordinary skill in the art.

Figure 13:
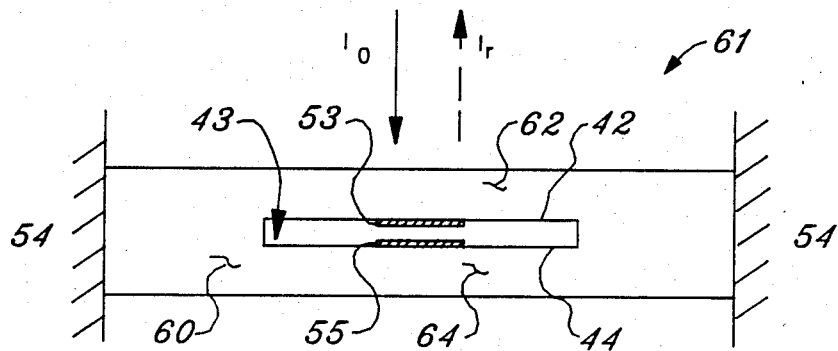
FIG. 13 shows an alternative related embodiment wherein one or both of the internal cavity surfaces of the double tuning fork includes a photothermally active coating.

In FIG. 13 there is shown partially reflecting boundary 42 which is the inside surface of tine 62, cavity 43, partially reflecting boundary 44 which is the inside surface of tine 64, end supports 54, partially reflecting coatings or films 53, 55, resonator 60, and resonant transducer 61.

In the alternative embodiment of FIG. 13 one or both of the internal cavity 43 tine surfaces (partially refelecting boundaries) 42 and 44 may be coated with partially reflecting films 53, 55, at least one of which may be partially absorbing and photothermally active. An example of a suitable material is molybdenum. Such a molybdenum layer may be, for example but not for limitation, between 1 and 1000 nanometers thick.

As an example, layers 53, 55 of molybdenum 10 nanometers thick on each cavity surface partially reflecting boundary 42 and 44 of fused quartz resonator 60 tine give a strong variation of light absorbed into the film as the cavity width 43 dimension x varies. The temperature rise in the molybdenum films will result in photothermal drive of the resonator.

Figure 8:
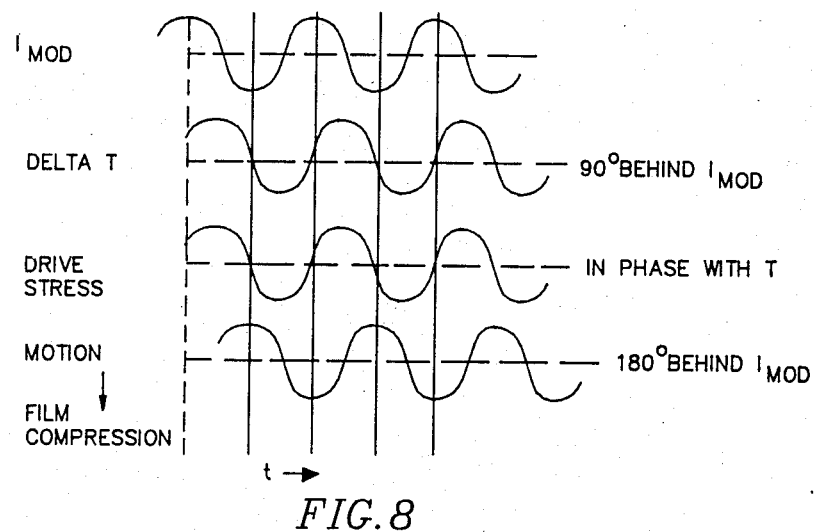
FIG. 8 shows the variation with time of several values related to operation of the apparatus shown in FIG. 7.

From the foregoing description in association with FIGS. 7 and 8, it is apparent that the at-rest cavity 43 width should in such case be selected to obtain positive feedback. FIG. 11 graphically depicts those locations where $x_{(max\ slope)}$ is greatest.

In order to understand how self-oscillations can be induced with very low levels of optical power, an indication of the magnitude of the gain factors $G_1$ and $G_2$ for the structures described above in reference to FIGS. 9 through 12 is in order. As a first example and not for limitation of the scope of the present claimed invention, a double tuning fork (DTF) may be constructed from two optically flat plates of fused quartz which are spaced apart at the ends and bonded together, as shown in FIGS. 9 and 10. The dimensions of such plates or tines 62, 64 may be in the range for w of $10^{-6}$ to $10^{-2}$ meters, for t of $10^{-6}$ to $10^{-2}$ meters, and for m (where m is the length of the slot of DTF resonator 60, see FIG. 9) of $10^{-4}$ to $10^{-1}$ meters. More particularly, w may be about $5\times10^{-5}$ meters, t may be about $5\times10^{-4}$ meters, and m may be about $10^{-2}$ meters. The overall length of the device is from about one to four times dimension m, and preferably twice m in order to allow for suitable mounting. This structure may have a fundamental mode resonance in the range from about 100 Hz to about 1 MHz. In the case of the particular dimensions given above for a resonator made from fused quartz the fundamental mode resonance is near 3 kHz when the applied axial force (F) is near zero. When force (F) is increased to about 4.4 Newtons (about 1 pound force) which may be one-half the breaking point of the device, the frequency increases. In this specific example, the frequency may exceed 10 kHz, providing a large dynamic range suitable for use as a force sensor.

If, in the DTF's shown in FIGS. 9, 10, and 12, a quarter-wavelength layer or film 53, 55 of a higher refractive index dielectric material is vacuum deposited on surfaces (partially reflecting boundaries) 42 and 44, the reflectivity (R) of each surface will be increased. Such higher-index materials include zinc sulfide (ZnS; index about 2.30) and titanium dioxide ($TiO_2$; index about 2.33). A quarter wave layer of zinc sulfide on a fused quartz substrate results in a reflectivity of 0.32 (R=0.32) at 830 nanometers. Alternating layers of high- and low-index material may also be used. Such lower-index materials include mangesium fluoride ($MgF_2$; index about 1.38) and silicon dioxide ($SiO_2$; index about 1.45). A sequence of three quarter-wave layers, e.g., zinc sulfide, magnesium fluoride, zinc sulfide, deposited on a fused quartz substrate results in a reflectivity of 0.67 at light wavelengths of about 830 nanometers.

These techniques are well known in the art of optical thin films. In a particular illustrative example (but not for limitation) select a resulting value of reflectivity (R) of 0.5, a wavelength of 830 nanometers, the cavity 43 to be either air or a vacuum with an index $n_c$ equal to 1, and an angle of incidence of zero. Turning to Equation III, differentiation of the Airy function (FIG. 6) in combination with Equation IV (FIG. 15) shows that a value of $x_{(max\ slope)}$ equal to 0.026 plus 0.415N micrometers will give positive feedback. Here, N is a positive integer or zero and is the order of interference in the cavity. With the previous illustrative value of $x_{(max\ slope)}$, gain $G_1$ equals 13.6/micrometer for the ideal case of monochromatic and parallel light. If N=0, this modulation efficiency can be approached even using a light-emitting diode (LED) source with a typical wavelength spread of 4% of the center wavelength and a 100 micrometer core multimode optical fiber which will result in a significant spread in the angle of rays incident on the cavity. As N (the order of interference) increases, these factors result in reduced light modulation as the higher order fringes become blurred. Use of a laser diode source and single mode fiber may extend the range of cavity 43 widths (x) which can provide useful light modulation.

Self-oscillations may be induced with very low light power levels. To reach the threshold of self-oscillation with, for example, 10 microwatts of optical power delivered to the device described above with $G_1$ = 13.6/micrometer, it will be apparent that the modulation gain or transfer function ($G_2$) must be at least 7.4 nanometers per microwatt (Equation I, FIG. 2). The combination of resonator design (and resulting Q) which converts stored mechanical energy into vibratory motion, and the photokinetic drive mechanism which converts modulated optical power into mechanical energy must together exceed this value of modulation gain ($G_2$). This may be achieved with the double tuning fork (DTF) resonator previously described. In practice it may be necessary for the self-oscillation threshold at very low amplitude of motion to be exceeded by about a factor of two in order to ensure reliable starting of the resonator from rest. It should be noted that resonator Q is improved by operation in a vacuum rather than in air.

As another example, silicon (or silicon-based material) may be used as the resonator substrate. In this case a wavelength of about 1.3 micrometers may be most convenient. Silicon has high transmission of optical energy at wavelengths of 1.3 micrometers. This is also a suitable wavelength for low-loss fiber optic communications which in addition enables use of readily available, low cost optical fiber pathways and components. Reflectivity of a bare, uncoated, silicon-to-air or silicon-to-vacuum interface is close to 0.3 at 1.3 micrometers and the transducer in FIG. 9 will produce an optomechanical loop gain ($G_1$) of about 4.6 per micrometer with the cavity width chosen according to Equations III and IV of $x_{(max\ slope)} = 0.071 + 0.65N$ micrometers.

In the above description of the resonant element incorporating an integral Fabry-Perot cavity, the need for a precisely controlled cavity space $x_{(max\ slope)}$ has been stressed. To simplify manufacture, the two tines 62 and 64, of FIGS. 9 and 10 may be fabricated such that the cavity 43 is slightly wedge shaped. That is, the cavity width is slightly greater at one crotch than at the other. By adjusting the location of the illuminating optical fiber and collimating means, to choose an illuminated region of the cavity having the desired separation, $x_{(max\ slope)}$ compensation can be made for small manufacturing tolerances.

In the second preferred embodiment of the present invention, principles of Michelson interferometry are illustrated which may be used to achieve the sensitive light modulation needed for an optical self-oscillating resonant sensor.

There is shown in FIG. 16 optical fiber 24, first collimator lens 76, first output lens 78, beamsplitter 80, first (or fixed) mirror 82, second (or target) mirror 84, and transmitted light flux 86.

FIG. 16 shows a simplified conventional Michelson interferometer. Unmodulated optical power from a light source (not shown) is supplied via an optical fiber 24 and collimated by lens 76. This input light beam, here shown as light flux ($I_0$) is split by beamsplitter 80 which may conveniently be a conventional cube beamsplitter. Light flux ($I_0$) is divided into two equal portions without polarization preference for the purposes of this embodiment. Mirrors 82 and 84 return light energy to the beamsplitter. Two output beams result. One beam is collected by lens 78 which exits as transmitted light flux 86 beam ($I_t$). The other beam (reflected beam $I_r$) is returned via optical fiber 24 pathway. Consider (for the present explanatory purposes only) that the first mirror 82 may be assumed as fixed and the second mirror 84 as a moving or vibrating surface having reflective characteristics. For the present purpose, this apparatus may be viewed as a portion of a resonant sensor unit.

The tranmitted light flux ($I_t$) is modulated as shown in FIG. 17 for the case of collimated monochromatic light which is parallel through the interferometer. Mirror and beamsplitter losses may be ignored for the present illustrative purposes. In the case where the beamsplitter divides the light equally with no polarization preference, the variation of $I_t$ with motion of second mirror 84 is given by Equation V (see FIG. 20). When the two arms of the interferometer are equal, constructive interference results and it is maximum. When mirror 84 moves a distance of one-quarter wavelength in either direction interference is destructive and it is minimum. In the ideal case, modulation of the output beam is from $I_0$ to zero and the reflected light power ($I_r$) and the transmitted light ($I_t$) are complementary.

The conventional simple Michelson interferometer configuration shown in FIG. 17 however, is not ideally suited for use with a resonant element as a moving mirror. The system can be advantageously modifed for use in combination with resonant elements for sensing a measurand, as in the present invention.

There is shown in FIG. 18 light source 22, optical fiber 24, beamsplitter 25, and detection means 26, as well as first collimator lens 76, first output lens 78, beamsplitter 80, first fixed mirror 82, target mirror 84, and transmitted light flux 86.

In the improvement shown in FIG. 18, lens 76 has been readjusted so as to focus the light beam through the interferometer to a focus on the two mirrors 82, 84. The small beam focus at mirror 84 is now compatible with the small area reflective surface of a resonant transducer. In addition, the convergent beam Michelson interferometer is much less sensitive to tilt misalignment of the mirrors 82 and 84.

There is shown in FIG. 19 the interference pattern (of a convergent-beam Michelson interferometer) and selected working points 100, 102, 104, and 106.

FIG. 19 illustrates the resulting variation in transmitted light flux ($I_t$) as the second "target" mirror 84 moves. The light and dark fringe pattern loses contrast as mirror 84 departs significantly from zero path length difference.

At close to zero path length difference (ZPD), the system is essentially as efficient a light modulator as is the conventional Michelson interferometer shown in FIGS. 16 and 17. Moreover, even if a broad-band light source is used, fringe modulation near ZPD is virtually undegraded and Equation V of FIG. 20 can again be used to calculate the modulation efficiency. It is preferred that operation be confined to the region near ZPD, which condition is easily fulfilled by the present invention.

Differentiation of Equation V (see FIG. 20) shows that the sensitivity to modulation yields optomechanical loop gain (see Equation VI, FIG. 21) which is comparable to the modulation efficiency of an ideal Fabry-Perot resonator, discussed previously with a reflectivity R=0.3 at the same wavelength. That is, the version of the invention discussed herein and based on the modified Michelson interferometer is equally sensitive and viable as is the Fabry-Perot version previously discussed.

The focussed beam Michelson interferometer based technique is therefore suitable for sensitive light modulation in a self-oscillating resonant element transducer. In contrast with the Fabry-Perot cavity technique of the first embodiment, which is integrated into the resonator itself, the Michelson interferometer based technique may be used with a wide variety of resonant structures, such as ribbons vibrating in torsion or flexure, tuning forks, DTF's, hollow beams, cantilever beams, and their substitutes and equivalents.

To complete the self-oscillating loop the modulated output beam should be used to drive the resonant element. This may be accomplished by directing the modulated light, for example, to a metal film on the resonator, where the metal film can couple the optical power to motion of the resonator by the photothermal effect. Alternatively, the light flux may be directed to and be absorbed by a photocell and converted to electric power. The electrical power may then be used to drive the resonator electromechanically or electromagnetically. The phase should be selected to optimize positive feedback. The resulting complementary modulated light beam, returned toward the source, carries the modulating frequency, and thus is related to the sensed measurand information, back to the remotely located control room.

Figures 21, 22:
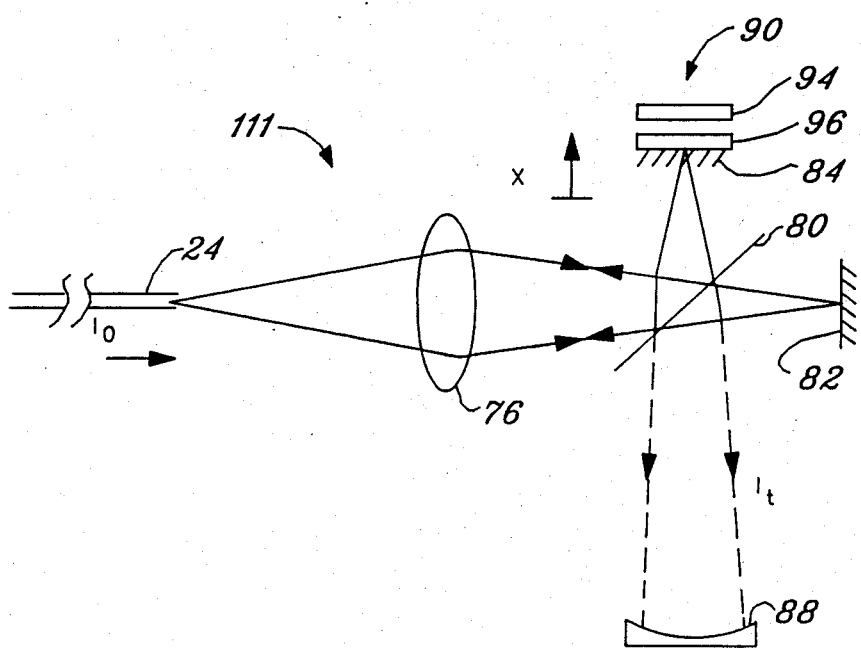
FIG. 21 is Equation VI, showing that sufficient optomechanical loop gain is available for sustained oscillation.
FIG. 22 illustrates a plan view of a Michelson interferometer in which a resonant transducer replaces the moving mirror of the Michelson interferometer depicted in FIG. 18.
Figure 23:
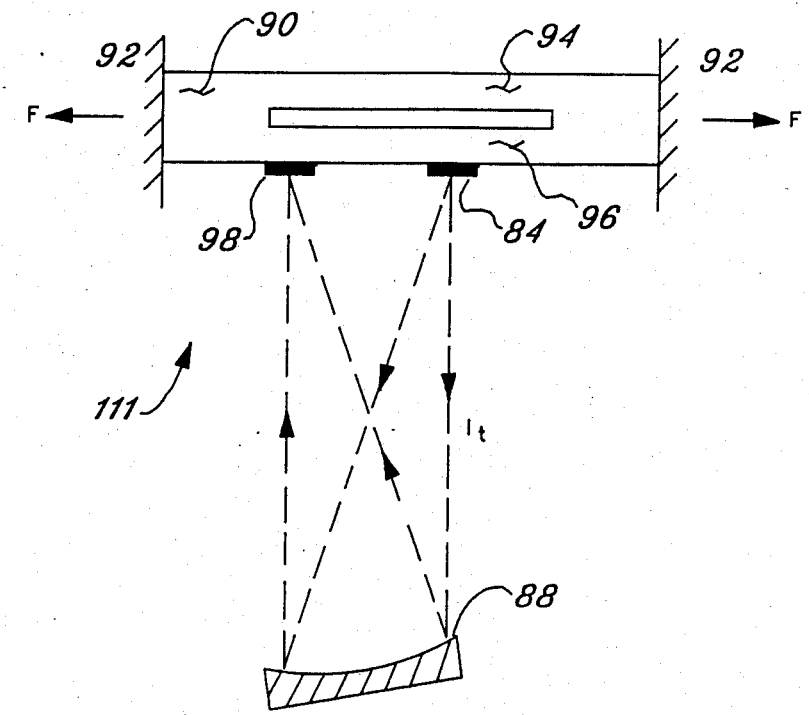
FIG. 23 shows an elevation view of the apparatus in FIG. 22.
Figure 28:
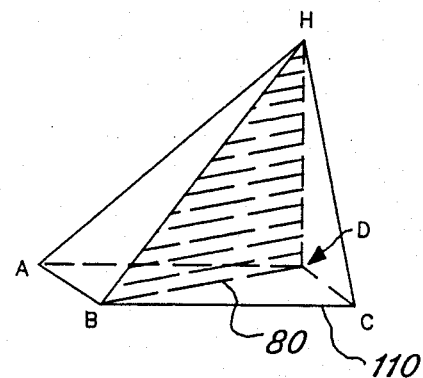
FIG. 28 is an alternative view of the prism beamsplitter.

Two views (plan and elevation) of an optical self-oscillating sensor 111 employing a convergent beam Michelson interferometer, are shown in FIGS. 22 and 23.

Shown in FIG. 22 are an optical fiber 24, first collimator lens 76, beamsplitter 80, fixed mirror 82, reflecting surface or mirror 84 of the resonant element, a spherical mirror 88, resonant transducer 90, first tine 94, and second tine 96.

There is shown in FIG. 23 a target mirror 84, spherical mirror 88, resonant transducer 90, end mounts 92, first tine 94, second tine 96 and photothermally active coating 98.

Tines 94 and 96 are supported between mounts 92 so that an axial force (F) related to a measurand can be applied. A reflective coating, which may if desired be metallic, preferably applied as mirror 84 on the outer edge of second tine 96. A photothermally active coating 98, for example of molybdenum (and its substitutes and equivalents) on a quartz (and the substitutes and equivalents thereof) substrate, may be deposited on the outside edge of tine 96 near the DTF crotch at the location indicated. Other locations are also possible.

The DTF may be made of any suitable material; crystal quartz, fused quartz or silicon are merely examples. Metal substrates may also be used, in which case the photothermally active coating 98 or mirror 84 reflective coating may not be required. The output lens 78 of FIG. 18 is preferably replaced by spherical mirror 88 so that the modulated optical power $I_t$ can be focussed on the resonator at the photothermally active location of coating 98 to provide photokinetic drive. However, output lens 78 and an optical fiber can be arranged to provide the same function.

It will be apparent from the explanation of FIGS. 7 and 8 and 16 through 19 that to achieve positive feedback in the optomechanical self-oscillating loop, the interferometer should be adjusted such that the output light beam $I_t$ delivered to coating 98 location is near the working point 100 on the interference pattern shown in FIG. 19). For example, the resonator 90 in its at-rest condition may be about lambda/8 (i.e., one-eighth wavelength) further from the beamsplitter than is the fixed mirror. Locations such as working point 104 or 106 may be used but the maximum modulation and hence maximum gain factor $G_1$ is achievable near point 100.

The first preferred embodiment previously described uses a Fabry-Perot optical resonator integral with the mechanical resonant transducer. This arrangement has inherent rejection of common mode motions of the resonant transducer as a whole relative to the mounting structure and light delivery system. In the Michelson interferometeric-based technique, FIGS. 22 and 23 any motion of beamsplitter 80 and fixed mirror 82 relative to resonator 90 will result in unwanted modulation of the light.

According to the first embodiment of the present invention, a prism beamsplitter may be used to avoid the undesirable effects of ambient vibration and thermally induced dimensional change. It is shown in FIGS. 24 through 27. The special prism beamsplitter 110 used is designed such that both Michelson interferometer beams can be made parallel so that they can be reflected from two adjacent locations on a moving resonator which locations have differential motion in the desired mode of resonance. In this way light modulation is the result of the desired resonant vibration as distinct from common mode motion of the resonator with respect to the beamsplitter prism or mounting structure.

There is shown in FIG. 24 optical fiber 24, first collimator lens 76, output lens 78, beamsplitter 80, end mounts 92, torsional ribbon resonator 108, optical self-oscillating sensor 111, prism entrance face 112, first 45-degree prism roof face 114, second 45-degree prism roof face 116, prism exit face 120, and special beamsplitter prism 110. In FIG. 25 there are shown prism entrance face 112, first 45-degree prism roof face 114 and prism bottom surface 118. Shown in FIG. 26 are second 45-degree prism roof face 116, prism bottom surface 118, and prism exit face 120. There is shown in FIG. 27 torsional ribbon resonator 108, prism entrance face 112, first 45-degree prism roof face 114 and prism bottom surface 118.

The resonant element shown in FIG. 24 is a torsional ribbon resonator 108 such that, as the mirror 82 reflecting surface (see FIG. 27) moves toward the beamsplitter prism 110, mirror 84 reflecting surface moves away. Common mode motion of the mirrors 82, 84 reflecting surfaces together affects both arms of the interferometric arrangement equally so as not to contribute to light modulation. The desired torsional mode has a push-pull effect on the interferometer arms and results in double the modulation sensitivity compared with the arrangement in FIGS. 22 and 23.

FIGS. 24 through 27 depict various projections of the novel prism beamsplitter. The light paths are somewhat complex to visualize three-dimensionally, thus FIGS. 24 through 27 show the prism beamsplitter in plan view and the front, side, and rear elevation views. Incident light flux $I_0$ enters prism beamsplitter 110 through face 112 and is divided by the beamsplitter half-mirror coating 80. The transmitted portion of the light flux meets 45-degree roof face 114 and is directed downwards through the bottom surface 118 of the prism beamsplitter 110 to focus on the resonator 108 at mirror portion 82. The portion of the light flux reflected by beamsplitter 80 of prism 110 strokes 45-degree roof face 116 and is similarly directed downwards through bottom surface 118 of prism 110 to focus on the resonator 108 at coating 84. The modulated output beam $I_t$ exits face 120 and can be used to drive the resonator in any of the various ways known to artisans in the field, including the methods known as photokinetic, and "opto-electric" and electromagnetic including the step of conversion of light to electricity.

By selecting suitable angles for the prism faces 112 and 120, the input ($I_0$) and exit ($I_t$) paths can be made (by refraction) to lie along the axis of the resonator and so produce a very compact optical sensor package.

In terms of the prism beamsplitter means depicted in FIGS. 24 through 28, light enters face CDH (112) and is split by the coating BDH (80) with transmitted and reflected split beams being totally internally reflected from faces ABH (114) and BCH (116) respectively before exiting bases ABD (118) and BCD (118) respectively to impinge on retro-reflecting surfaces of the resonator. The resulting recombined and modulated transmitted beam exits face ADH (120) and the recombined and modulated reflected beam exits face CDH (112), back towards the source.

In an alternative embodiment, a Michelson interferometer can be constructed using optical fibers and a fiber splitter so as to eliminate the need for bulk optic components. The optical fibers transporting the split beams may terminate close to reflective locations on the resonator and so sense differential motion while discriminating against common mode undesired motions.

Figure 29:
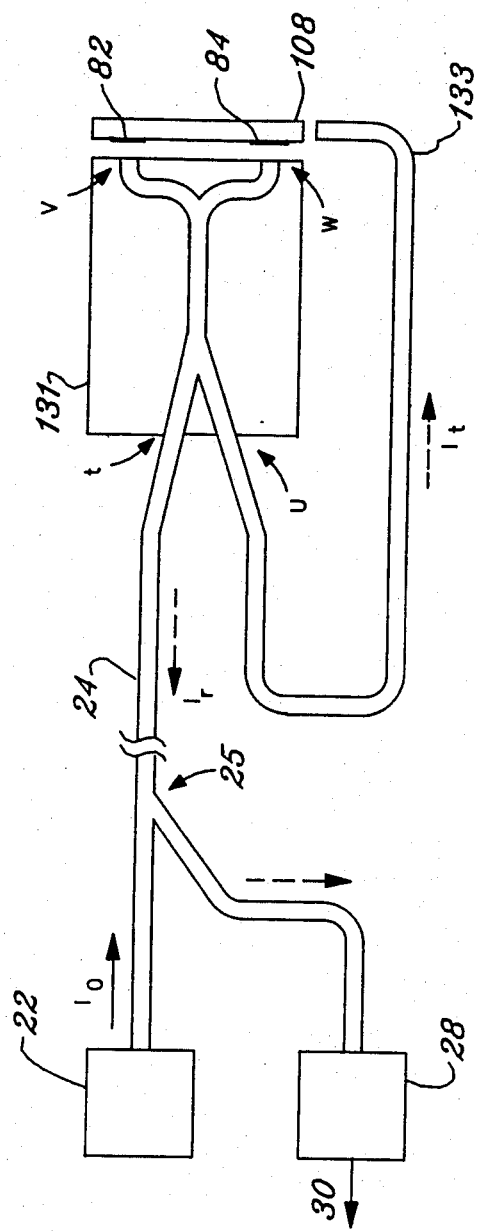
FIG. 29 shows an alternate Michelsondrive scheme using a four-port coupler.

In yet another alternative embodiment, an integrated optic splitter may be used. The apparatus of FIG. 29 operates with a steady light source 22 providing a beam of steady light along fiber optic pathway 24 to four-port coupler 131 at entry port t, in which coupler the incoming light is split into two pathways internally to shine on mirrors 82 and 84 via ports v and w, respectively. The mirrors 82 and 84 are surface areas on resonator 108. Alternating torsional oscillations of the resonator 108 vary the optical path of the light reflected by the mirrors (i.e. modulate the output beams according to the oscillation frequency of the resonator) back into ports u and t. The resonant frequency of resonator 108 may be varied in relation to an external value, which may be a measurand. A portion of the modulated light is returned along fiber optic 24 pathway carrying the frequency of the resonator and another portion is used to drive the resonator by positive feedback by fiber optic 133 pathway. This latter portion of the modulated light is used to drive the resonator 108 into resonant vibrations, such as by the photokinetic effect previously described, or such other methods as are known to those persons skilled in the art.

The invention is not to be limited by the preferred embodiments already described. Other interferometric techniques can be employed to construct a self-oscillating optomechanical oscillating loop in the invention as claimed in the appended claims.

Other interferometric techniques may be used as would be apparent to one skilled in the art. For example, two regions of a resonator which flex relative to each other could be used as the mirrors in the classic Fresnel double mirror experiment, resulting in sensitive light modulation. Moiré interferometric modulation techniques may also be employed.

I claim:

1. Apparatus to drive a mechanical resonator from a source of optical power, comprising:
   (a) means for communicating said optical power to the mechanical resonator; (and)
   (b) optical interferometric means for conversion of the optical power to (vibration) vibratory motion of the resonator(.); and
   (c) resonator means for modulation of said optical power.

2. Apparatus as in claim 1 wherein the product of the source-to-modulated light gain G1 and the modulated light-to-mechanical motion gain G2 of said conversion multiplied by the incident optical power $I_0$ is at least one.

3. The apparatus of claim 1 in which there is a power threshold for sustained oscillation of the resonator and this threshold is reached or exceeded.

4. The apparatus of claim 3 in which the resonator sustained oscillation threshold is preferably exceeded by a factor greater than 2.

5. The apparatus of claim 1 in which the resonator is located in a vacuum.

6. The apparatus of claim 1 in which the vibrating resonator modulates the light.

7. An optically-powered mechanically resonant apparatus for sensing a physical parameter, or measurand, at a measurement site, comprising:
   (a) source means of optical power;
   (b) optical pathway means for communicating said optical power to said measurement site;
   (c) vibratable resonator means having a resonant frequency of vibration and being coupled to the measurand;
   (d) means for relating changes in the resonant frequency of the resonator to a changing measurand;
   (e) means for converting said at least a portion of said optical power into mechanical vibratory motion of said resonator;
   (f) optical interferometric means for modulating at least a portion of said optical power by motion of said resonator means;
   (g) detection means for converting a portion of said modulated optical power into signals related to the measurand; and
   (h) means for returning said signal portion of said modulated optical power to said detection means.

8. Apparatus as in claim 7 wherein said resonator means includes a resonant ribbon.

9. Apparatus as in claim 7 wherein said resonator includes at least one mechanical beam element.

10. Apparatus as in claim 7 wherein elements (a) and (g) are located at a first location and elements (c), (d), (e), and (f) are located at a separate second location.

11. Apparatus as in claim 10 wherein said source optical power is communicated to the second location and said modulated optical power is communicated to the first location along optical fiber pathway means.

12. Apparatus as in claim 11 wherein said optical pathway means is a single fiber optical pathway.

13. Apparatus as in claim 7 wherein said optical interferometric means includes a Fabry-Perot cavity.

14. Apparatus as in claim 13 further including thin film coatings used to enhance the finesse of the Fabry-Perot optical cavity.

15. Apparatus as in claim 13 wherein partially absorbing thin film coatings in the Fabry-Perot optical cavity are used to directly convert optical power to resonator motion (through the photothermal effect).

16. Apparatus as in claim 13 wherein the Fabry-Perot cavity is wedge shaped.

17. Apparatus as in claim 13 wherein the Fabry-Perot cavity space is adjacent the zero or low order of interference so that non-monochromatic light and multimode optical fibers may be employed.

18. Apparatus as in claim 7 wherein the Fabry-Perot cavity is integral with the vibratable resonator.

19. Apparatus as in claim 7 wherein said optical interferometric means includes a Michelson interferometer.

20. Apparatus as in claim 19 wherein said optical interferometric means is a convergent beam Michelson interferometer.

21. Apparatus as in claim 7 wherein said means for converting said modulated optical power into mechanical energy includes means for conversion of optical power to thermal energy.

22. Apparatus as in claim 7 wherein said means for converting said modulated optical power into mechanical energy includes means for conversion of optical power to electrical power.

23. An optically-powered resonant apparatus for sensing a physical parameter, or measurand, at a measurement site, comprising:
   (a) source means of optical power;
   (b) optical pathway means communicating said optical power to said measurement site;
   (c) vibratable resonator means coupled to the measurand;
   (d) means for relating the frequency of the resonator to the measurand;
   (e) Michelson interferometric means for modulating at least a portion of said optical power by motion of said resonator means;
   (f) means for producing amplitude divided interferometer beams and for directing at least one of the amplitude divided interferometer beams to the resonator and to recombine said beams to produce modulated optical power;
   (g) means for converting at least a portion of said modulated optical power into mechanical energy of said resonator;
   (h) detection means for converting a portion of the modulated optical power into signals; and
   (i) means for returning a portion of said signal modulated optical power to said detection means.

24. Apparatus as in claim 23 which is selectively sensitive to the desired mode of resonator vibration.

25. Apparatus as in claim 23 wherein said Michelson optical interferometric means is a convergent beam Michelson interferometer.

26. Apparatus as in claim 23 wherein said means for producing amplitude divided optical power to the resonator includes beamsplitter means such that said resonant apparatus is less sensitive to undesired motion between the resonator, beamsplitter, and beamsplitter mounting means.

27. The method of sensing a physical parameter, or measurand, by a vibratable resonator at a measurement site, comprising the steps of:
   (a) generating a beam of optical power;
   (b) communicating said optical power to said measurement site;
   (c) relating said measurand to the frequency of the vibratable resonator such that the resonant frequency varies in relation to changes of said measurand;
   (d) modulating at least a portion of the optical power by optical interferometry; and
   (e) conversion of said at least a portion of said modulated optical power to mechanical energy of said resonator as (vibration) vibratory motion thereof.

28. The method of claim 27 wherein said generation of source optical power occurs at a first location separated from the measurement site, further including the step of returning at least a portion of the modulated optical power to said first location.

29. The method of claim 28 wherein the source optical power is communicated to the measurement site by optical fiber pathway means and the modulated optical power is communicated to the first location via optical fiber pathways.

30. The method of claim 29 wherein said optical fiber pathway means is a single fiber optic pathway.

* * * * *

UNITED STATES PATENT AND TRADEMARK OFFICE
CERTIFICATE OF CORRECTION

PATENT NO. : 4,733,561                                    Page 1 of 2

DATED : May 29, 1988

INVENTOR(S) : Anthony C. GILBY

It is certified that error appears in the above-identified patent and that said Letters Patent is hereby corrected as shown below:

IN THE SPECIFICATION:

Column 3, line 40, "prferred" should be --preferred--;

line 59, delete "how";

Column 4, line 24, "Michelson-drive" should read --Michelson interferometric drive--;

Column 5, line 3, "unit" should read --unity--;

Column 8, line 37, "tine" should read --tines--;

Column 10, line 56, "tranmitted" should read --transmitted--;

Column 11, line 4, "Fig. 17" should read --Fig. 16--;

Column 12, line 24, "metallic, preferably" should read --metallic, is preferably--;

line 48, "Fig. 19)" should read --Fig. 19--;

Column 13, line 47, "strokes" should read --strikes--.

UNITED STATES PATENT AND TRADEMARK OFFICE
CERTIFICATE OF CORRECTION

PATENT NO. : 4,733,561

DATED : May 29, 1988

INVENTOR(S) : Anthony C. GILBY

It is certified that error appears in the above-identified patent and that said Letters Patent is hereby corrected as shown below:

IN THE CLAIMS:

Claim 1, line 4, delete "and";

line 6, delete "(vibration)";

line 7, delete "(.)".

Claim 15, line 4, delete "(through the photothermal effect)".

Claim 27, line 15, delete "(vibration)".

Signed and Sealed this

Twenty-seventh Day of December, 1988

Attest:

DONALD J. QUIGG

Attesting Officer

Commissioner of Patents and Trademarks